(12) United States Patent
Arthur

(10) Patent No.: US 10,357,862 B2
(45) Date of Patent: Jul. 23, 2019

(54) PNEUMATICALLY OPERATED PERCUSSIVE TOOL DRIVER WITH INTEGRAL DEBRIS SUCTION APPARATUS

(71) Applicant: Robert Arthur, Trenton, MI (US)

(72) Inventor: Robert Arthur, Trenton, MI (US)

(73) Assignee: G. A. W. INC., Romulus, MI (US)

( * ) Notice: Subject to any disclaimer, the term of this patent is extended or adjusted under 35 U.S.C. 154(b) by 6 days.

(21) Appl. No.: 15/877,542

(22) Filed: Jan. 23, 2018

(65) Prior Publication Data

US 2018/0236621 A1     Aug. 23, 2018

Related U.S. Application Data

(60) Provisional application No. 62/461,000, filed on Feb. 20, 2017.

(51) Int. Cl.
| | | |
|---|---|---|
| *B23Q 11/00* | (2006.01) | |
| *B25D 9/08* | (2006.01) | |
| *B23B 47/34* | (2006.01) | |

(52) U.S. Cl.
CPC ........ *B23Q 11/0046* (2013.01); *B23Q 11/005* (2013.01); *B23Q 11/0071* (2013.01); *B25D 9/08* (2013.01); *B23B 47/34* (2013.01)

(58) Field of Classification Search
CPC ... B23B 47/34; B23Q 11/0046; B23Q 11/005; B23Q 11/0071; B25D 9/08
See application file for complete search history.

(56) References Cited

U.S. PATENT DOCUMENTS

| | | | |
|---|---|---|---|
| 3,339,435 A | | 9/1967 | Heitz |
| 3,638,737 A | * | 2/1972 | Moates ............... B23Q 11/0046 173/60 |
| 3,964,212 A | | 6/1976 | Karden |
| 4,036,308 A | * | 7/1977 | Dellenberg ............. E21B 21/16 173/75 |
| 4,205,728 A | * | 6/1980 | Gloor ................. B23Q 11/0046 175/209 |
| 4,361,957 A | * | 12/1982 | Krotz ...................... B08B 15/04 227/156 |
| 4,955,984 A | | 9/1990 | Cuevas |
| 5,228,244 A | * | 7/1993 | Chu ....................... B24B 55/102 451/343 |
| 6,729,811 B2 | * | 5/2004 | Kamphuis ................. B23B 3/24 29/888.061 |
| 7,740,086 B2 | | 6/2010 | Bleicher et al. |

(Continued)

FOREIGN PATENT DOCUMENTS

GB                842174 A * 7/1960 ......... B23Q 11/0046

*Primary Examiner* — Nicole N Ramos

(74) *Attorney, Agent, or Firm* — Mark Navarre

(57) ABSTRACT

A pneumatically operated tool driver has a debris suction apparatus including a dust gathering assembly fastened to the front head of tool driver and surrounding the tool, a venturi element mounted on the tool driver, and an air diverting apparatus that uses pressurized air to establish an airflow through the venturi element to create a suction upstream of the venturi element that draws debris from the dust gathering assembly to a dust collection site. The air diverting apparatus obtains the pressurized air from an exhaust diverter that captures pressurized exhaust air expelled through the tool driver's exhaust port, and from a capillary tube coupled to the tool driver's inlet air port.

7 Claims, 1 Drawing Sheet

(56) References Cited

U.S. PATENT DOCUMENTS

| | | |
|---|---|---|
| 7,901,164 B2 | 3/2011 | Skradski et al. |
| 8,793,835 B2 * | 8/2014 | King, Jr. .............. B23D 59/006 |
| | | 15/339 |
| 8,911,186 B2 * | 12/2014 | Hahn ................ B23Q 11/0046 |
| | | 408/115 R |
| 9,022,702 B2 | 5/2015 | Kasuya et al. |
| 2013/0087357 A1 * | 4/2013 | King, Jr. ............ B23Q 11/0046 |
| | | 173/199 |

* cited by examiner

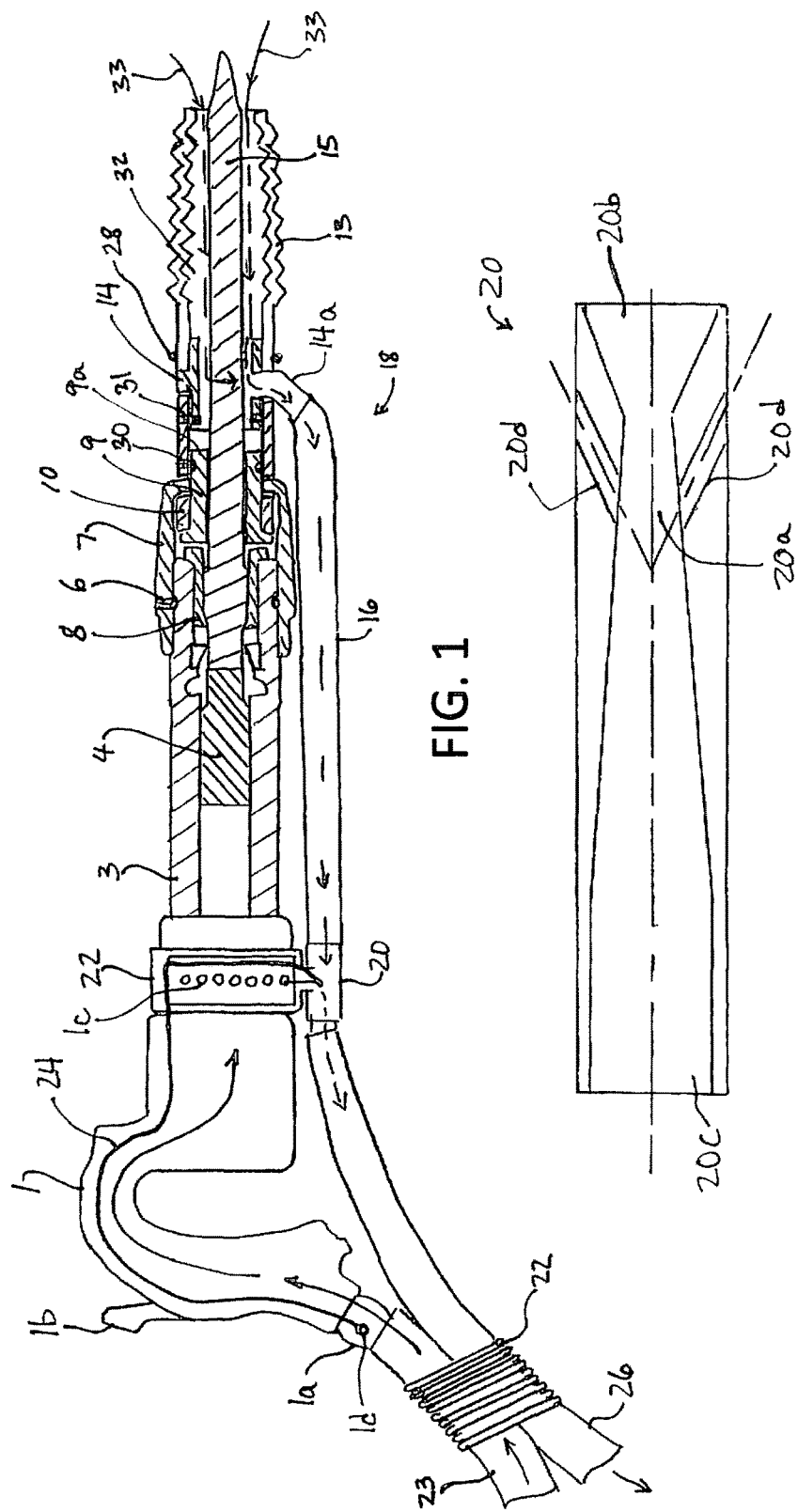

PNEUMATICALLY OPERATED PERCUSSIVE TOOL DRIVER WITH INTEGRAL DEBRIS SUCTION APPARATUS

RELATED APPLICATIONS

This application claims priority based on the Provisional Patent Application No. 62/461,000, filed Feb. 20, 2017.

TECHNICAL FIELD

This invention relates to a pneumatically operated percussive tool driver that repeatedly impacts a workpiece with a tool such as a chisel or pick, and more particularly to a tool driver having an integral debris suction apparatus for collecting and removing dust and small fragments of the workpiece created by the impacting action of the tool.

BACKGROUND OF THE INVENTION

Pneumatically operated percussive tool drivers such as pick or chisel hammers, rivet busters, rock-drills and so forth are frequently used in industrial applications, and various expedients have been employed to minimize or contain airborne debris produced by the impacting action of the tool. One approach, exemplified by the U.S. Pat. No. 7,740,086 to Bleicher et al. and U.S. Pat. No. 9,022,702 to Kasuya et al., is to attach a suction device to the body or housing of the tool driver to collect and remove the debris. The suction device includes a dust containment hood attached to the tool end of the tool driver housing and a hose coupling the hood to a suction device such as an industrial vacuum cleaner for removing debris within the dust containment hood.

While the approach represented by Bleicher et al. and Kasuya et al. is effective, it can be cumbersome and inconvenient to transport an industrial vacuum to every work site, and not all work sites have a local electric power source for the vacuum.

SUMMARY OF THE INVENTION

The present invention is directed to an improved pneumatically operated percussive tool driver having an integral debris suction apparatus powered by the tool driver exhaust and the air pressure supplied to the tool driver for drawing workpiece dust and debris away from the tip of the tool.

The debris suction apparatus includes a dust gathering assembly fastened to the front head of tool driver and surrounding the tool, a venturi element mounted on the tool driver, and an air diverting apparatus that uses pressurized air to establish an airflow through the venturi element to create a suction upstream of the venturi element that draws debris from the dust gathering assembly to a dust collection site. The dust gathering assembly includes a tubular snorkel fastened to the front head of the tool driver, a dust bellows mounted on the snorkel and extending substantially to the tip of the tool, and a suction hose coupling an exhaust port of the snorkel to an inlet of the venturi element. The air diverting apparatus obtains the pressurized air from an exhaust diverter that captures pressurized exhaust air expelled through the tool driver's exhaust port, and from a capillary tube coupled to the tool driver's inlet air port.

BRIEF DESCRIPTION OF THE DRAWINGS

FIG. 1 is partial cross-sectional side view of a pneumatically operated percussive tool driver equipped with a debris suction apparatus according to this invention.

FIG. 2 is an enlarged cross-sectional view of a venturi element of the debris suction apparatus of FIG. 1.

DESCRIPTION OF THE PREFERRED EMBODIMENT

In general, the debris suction apparatus of this invention is applicable to any pneumatically operated percussive tool drivers coupled to a source of compressed air, such as chipping hammers, riveting hammers, rivet busters, demolition tool drivers, pavement breakers, rock drills, and so on. In any of these tool drivers, compressed air obtained from an air supply line coupled to the tool driver and used to produce percussive movement of the tool is expelled through one or more exhaust ports after each successive stroke of the tool. Normally, the expelled air, which is typically pressurized on the order of 35 psi, is released is into the atmosphere, but the debris suction apparatus of the present invention utilizes the energy of the expelled air to create an airflow and suction for removing dust and small pieces of debris collected in the vicinity of the tool and the workpiece impacted by the tool.

Referring to FIG. 1, the debris suction apparatus of this invention is illustrated as applied to a typical percussive chipping hammer (variously referred to herein as the tool driver or air tool), equipped with a chisel 15. The tool driver has a tubular barrel 3 fitted with a handle 1 at one axial end and a tool retainer 7 at the other axial end. The handle 1, which may take various other shapes (D-shaped, or T-shaped, for example), includes an inlet air port 1a adapted to be coupled to a source of compressed air by the air supply hose 23, an internal air passage coupling the inlet air port 1a to a piston 4 by way of a control valve (not shown) operated by a trigger 1b integrated into the handle 1.

The chisel 15 is received within the barrel 3 and an upper sleeve 8, and the tool retainer 7 is locked onto the barrel 3 with a retainer—6 to retain the chisel 15 within the barrel 3. Inward movement of the chisel 15 is limited by the upper sleeve 8, while outward movement of the chisel 15 is limited by a lower sleeve 9. The lower sleeve 9 is partially received within the retainer 7; and a rubber bumper 10 dampens noise and vibration due to percussive impacting of the chisel 15 and the lower sleeve 9. The lower sleeve 9 differs from its conventional counterpart in that its outboard end 9a protrudes through and outboard of the retainer 7 to afford attachment of the debris suction apparatus of this invention.

The debris suction apparatus is generally designated in FIG. 1 by the reference numeral 18, and in addition to the extended lower sleeve 9, includes: a flexible dust bellows or boot 13 with accordion-style pleating, a tubular snorkel 14, a tubular coupling 11, a venturi element 20 (also depicted in FIG. 2), a suction hose 16, an exhaust diverter 22 directing pressurized exhaust gases to the venturi element 20, a capillary tube 24 directing pressurized air from inlet air port 1a to the venturi element 20, and an exhaust hose 26 coupling the venturi element 20 to a dust collection bag or device (not shown). As shown, the exhaust hose 26 may be conveniently bundled with the air supply hose 23 with a spiral band 22 just upstream of the air tool's inlet air port 1a.

The coupling 11, snorkel 14 and bellows 13 define a debris gathering assembly, and they surround the otherwise exposed portion of the chisel 15. The bellows 13 is preferably substantially transparent so as to not obstruct the user's view of the chisel 15 and the space between it and the chisel 15. The outboard end of bellows 13 extends substantially to the tip of the chisel 15 as shown, and its inboard end is stretched over the outboard end of the snorkel 14 and secured with a clamp 28. The coupling 11 secures the snorkel 14 to the outboard end 9a of lower sleeve 9; its inboard end slides over the end 9a of lower sleeve 9 and is retained thereon with a first retainer spring 30, and its outboard end slides over the inboard end of snorkel 14 and is retained thereon with a second retainer spring 31. And of course, the first retainer spring 30 may be conveniently removed to detach the debris gathering assembly from the tool driver. While the lower sleeve 9 is sealed against the periphery of the chisel 15, the inner peripheries of coupling 11, snorkel 14 and bellows 13 are radially spaced from the chisel 15 to define an annular debris collection passage 32 through which dust and debris created by the percussive action of the chisel 15 are drawn, as illustrated by the arrows 33. Dust and debris drawn through the passage 32 are drawn through an exhaust port 14a of snorkel 14 for eventual delivery to a dust collection site.

Suction hose 16 couples the exhaust port 14a of snorkel 14 to the inlet 20b of the venturi 20 element, and the exhaust diverter 22, a capillary tube 24 and venturi element 20 cooperate to create a suction in suction hose 16 for drawing away dust and debris as described. In general, and referring to FIG. 2, this is accomplished by directing jets of pressurized air into the neck portion 20a of venturi element 20 through a series of angled passages 20d in the body of the venturi element 20, two of which are depicted in FIG. 2. As seen in FIG. 2, the inlet 20b of venturi 20 narrows sharply to the neck portion 20a, and then progressively widens in the direction of the venturi's outlet 20c. The jets of pressurized air in the angled passages 20d are directed into the neck portion 20a to establish an airflow from the inlet 20b to the outlet 20c. The velocity of the airflow increases dramatically in the neck portion 20a, and due to a phenomenon known as the Bernoulli Effect, a relatively low pressure, or suction, is thereby created upstream of the venturi element's inlet 20b—that is, in the suction hose 16.

The jets of pressurized air for the angled passages 20d of venturi 20 are obtained from two sources, both of which are available on the air tool. The first source of pressurized air is the exhaust gas released by air tool through a series of exhaust ports 1c in its handle 1. The exhaust diverter 22, configured as a clamshell, surrounds the periphery of the handle 1 in the vicinity of the exhaust ports 1c so as to capture the pressurized exhaust air in an internal cavity thereof, and direct it to the venturi element's angled passages 20d. The second source of pressurized air is the pressurized air in air supply line 23, and the capillary tube 24 taps into that air supply from a peripheral opening 1d in the tool driver's inlet air port 1a. As illustrated in FIG. 1, the capillary tube 24 is routed along the handle 1 and directs the pressurized air into the venturi element's angled passages 20d.

When an operator is ready to use the air tool, and connects its air supply line 23 to a source of compressed air, the capillary line 24 directs a jet of pressurized air into the angled passages 20d of venturi 20, which creates an initial suction in suction hose 16 before the operator even activates the air tool. And when the air tool is activated, the high pressure exhaust gases collected by the exhaust diverter are also directed into the angled passages 20d of venturi 20, augmenting the suction in suction hose 16. The suction in suction hose 16 draws dust and debris away from the tip of the chisel 15, through the bellows 13 and snorkel 14, for transport to a remote dust containment bag or device. Although an industrial vacuum canister is not necessary, the exhaust hose 26 can of course be connected to the suction port of such a vacuum canister, in which case the suction effect created by the debris suction apparatus will add to the suction of the vacuum canister.

In summary, the debris suction apparatus of the present invention operates to remove dust and small debris produced by percussive impacting of a tool on a workpiece, and eliminates the need of an industrial vacuum to create the needed suction. Additionally, diverting the exhaust of the tool driver into the venturi 20 and exhaust hose 26 significantly reduces the noise otherwise created by operation of the tool driver. The various elements of the apparatus may be constructed of metal or plastic, as appropriate, and of course, it will be recognized that while the invention has been described in reference to the illustrated embodiment, numerous modifications and variations in addition to those mentioned herein will occur to those skilled in the art, and still fall within the intended scope of the invention.

The invention claimed is:

1. Debris suction apparatus for a tool driver that utilizes supplied pressurized air to impart percussive movement to a tool retained in one end of the tool driver, comprising:

a dust gathering assembly fastened to said one end of said tool driver and surrounding said tool to capture debris produced when said tool impacts a workpiece, said dust gathering assembly including a tubular snorkel having an inboard end fastened to said one end of said tool driver, an inner periphery radially spaced from said tool to define a debris collection passage, and an exhaust port opening into said debris collection passage, and a hollow tubular dust bellows having an inboard end fastened to an outboard end of said tubular snorkel, and an outboard end terminating near a tip of said tool;

a venturi element mounted on said tool driver, said venturi element having an inlet coupled to said dust gathering assembly, an outlet coupled to a dust collection site, a throat portion coupling said inlet to said outlet, and a series of angled air passages in a body of said venturi element that open into said throat portion; and air diverting apparatus that directs pressurized air into to said series of angled air passages of said venturi element to establish an airflow from said inlet to said outlet, thereby creating a suction upstream of the venturi element's inlet that draws said debris captured by said dust gathering assembly through said venturi element and to said dust collection site.

2. The debris suction apparatus of claim 1, further comprising:

a suction hose coupled between the exhaust port of said snorkel and the inlet of said venturi element.

3. The debris suction apparatus of claim 1, where the supplied pressurized air is delivered to said tool driver through an air supply hose, and said debris suction apparatus further comprises:

an exhaust hose coupled between the outlet of said venturi element and said dust collection site; and a band that bundles said exhaust hose and said air supply hose.

4. The debris suction apparatus of claim 1, where said tool driver expels pressurized exhaust air through an exhaust port after utilizing the supplied pressurized air to impart percussive movement to a tool, and said air diverting apparatus comprises:

an exhaust diverter fastened to a barrel of said tool driver, including an internal cavity that captures the pressurized exhaust air expelled through said exhaust port said exhaust port and directs said pressurized exhaust air through said series of angled air passages in the body of said venturi element so that pressurized air from exhaust port is utilized to establish said airflow from the inlet to the outlet of said venturi element.

5. The debris suction apparatus of claim 4, where the supplied pressurized air is delivered to an inlet air port of said tool driver through an air supply hose, and said air diverting apparatus comprises:

a capillary tube coupled between an opening in said inlet air port and one or more of the angled air passages in the body of said venturi element so that pressurized air from inlet air port is additionally utilized to establish said airflow from the inlet to the outlet of said venturi element.

6. The debris suction apparatus of claim 1, where the supplied pressurized air is delivered to an inlet air port of said tool driver through an air supply hose, and said air diverting apparatus comprises:

a capillary tube coupled between an opening in said inlet air port and one or more of the angled air passages in the body of said venturi element so that pressurized air from inlet air port is utilized to establish said airflow from the inlet to the outlet of said venturi element.

7. The debris suction apparatus of claim 6, where said tool driver includes a handle coupled to said inlet air port, and wherein:

said capillary tube is routed to said venturi element along an outer periphery of said handle.

\* \* \* \* \*